(12) United States Patent
Koziol et al.

(10) Patent No.: US 11,536,337 B2
(45) Date of Patent: Dec. 27, 2022

(54) SLACK ADJUSTER FOR A BRAKE SYSTEM

(71) Applicant: Westinghouse Air Brake Technologies Corporation, Wilmerding, PA (US)

(72) Inventors: Michael Anthony Koziol, Berwyn, IL (US); Scott Lee Natschke, Bourbonnais, IL (US); Peter Paul Gregar, Greenville, SC (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 16/725,431

(22) Filed: Dec. 23, 2019

(65) Prior Publication Data

US 2020/0132148 A1 Apr. 30, 2020

Related U.S. Application Data

(63) Continuation-in-part of application No. 15/241,141, filed on Aug. 19, 2016, now Pat. No. 10,562,550.

(51) Int. Cl.
*F16D 65/66* (2006.01)
*F16D 65/54* (2006.01)
*B61H 15/00* (2006.01)

(52) U.S. Cl.
CPC ......... *F16D 65/54* (2013.01); *B61H 15/0057* (2013.01)

(58) Field of Classification Search
CPC ............ B61H 15/0028; B61H 15/0014; B61H 15/0007; B61H 15/0057; B61H 15/00; B61H 15/0085; F16D 65/56; F16D 65/52; F16D 65/66; F16D 65/561; F16D 65/563; F16D 65/567

See application file for complete search history.

(56) References Cited

U.S. PATENT DOCUMENTS

| 1,887,586 A | 11/1932 | Jurson |
| 3,249,183 A | 5/1966 | Billeter |
| 3,324,977 A | 6/1967 | Billeter |

(Continued)

OTHER PUBLICATIONS

Office Action dated Mar. 25, 2020 for CN application No. 201680089796X (11 pages).

(Continued)

*Primary Examiner* — Robert A. Siconolfi
*Assistant Examiner* — Stephen M Bowes
(74) *Attorney, Agent, or Firm* — The Small Patent Law Group LLC; Joseph M. Butscher (57) ABSTRACT

A slack adjuster for use with a braking system which has an increased let-out length that enables the use of brake shoes having an increased thickness. The slack adjuster includes a dual spring and canister assembly, an external yoke trigger, or a combination of both the dual spring and canister assembly and the external yoke trigger. A method of retrofitting a truck-mounted brake system is provided, in which the slack adjuster is positioned within the brake system in order to increase the let-out length while maintaining a predetermined spatial envelope within the brake system. The slack adjuster has an increased let-out length enabling the use of thicker brake shoes without requiring modification of the interacting components of the truck mounted brake (Continued)

system since the overall size of the slack adjuster remains the same.

9 Claims, 12 Drawing Sheets

(56) References Cited

U.S. PATENT DOCUMENTS

| | | | |
|---|---|---|---|
| 3,326,335 A | 6/1967 | Billeter | |
| 3,435,923 A | 4/1969 | Billeter | |
| 3,533,492 A | 10/1970 | Campbell | |
| 3,595,347 A | 7/1971 | Billeter | |
| 3,669,224 A | 6/1972 | Billeter | |
| 4,138,002 A | 2/1979 | Sander et al. | |
| 4,646,882 A | 3/1987 | Holloway et al. | |
| 4,775,035 A | 10/1988 | Brodeu et al. | |
| 10,562,550 B2* | 2/2020 | Koziol | B61H 15/0057 |
| 2007/0023241 A1* | 2/2007 | Ring | B61H 13/36 188/124 |
| 2016/0075353 A1 | 3/2016 | Huber, Jr. et al. | |

OTHER PUBLICATIONS

Office Action dated Apr. 16, 2020 for corresponding Russian Patent Application No. 2016145234 (7 pages).
English translation of Office Action dated Apr. 16, 2020 for corresponding Russian Patent Application No. 2016145234 (7 pages).
Search Report dated Nov. 18, 2016 for corresponding Russian Patent Application No. 2016145234 (2 pages).
English Translation of Search Report dated Nov. 18, 2016 for corresponding Russian Patent Application No. 2016145234 (2 pages).
IPRP and ISRWO for corresponding International application No. PCT/US2016/062216.
Office Action for corresponding Canadian Patent Application No. 3,033,632 dated Jun. 22, 2021 (3 pages).
Examination report No. 1 dated Aug. 10, 2022 for corresponding Australian patent application No. 2016419848.
First Office Action dated Sep. 29, 2022 for co-pending MX/a/ 2019001974 (6 pages).

* cited by examiner

SLACK ADJUSTER FOR A BRAKE SYSTEM

CROSS-REFERENCE TO RELATED APPLICATIONS

This application is a continuation-in-part of U.S. patent application Ser. No. 15/241,141, which was filed on 19 Aug. 2016, now U.S. Pat. No. 10,562,550, and the entire disclosure of which is incorporated herein by reference.

BACKGROUND

Technical Field

The subject matter described herein relates to a slack adjuster for a vehicle brake system.

Description of Related Art

Slack adjusters are widely used in brake systems in the railway industry to adjust the brakes and to automatically compensate for slack in the brake rigging, which occurs after repeated brake applications. Slack can be caused by component wear in the brake rigging, brake shoe wear, wheel wear, and the like. One example of a brake system that uses a slack adjuster is a truck mounted brake system. Truck mounted braking systems are well-known in the railway industry and typically comprise a series of force transmitting members, levers, and linkages which function to move a group of brake shoes against the wheels of a railway vehicle to effect stoppage of the railway vehicle. Examples of truck mounted brake systems include TMX® or UBX® systems, where two brake beams are provided per truck to provide the braking force to the two axles of the truck. The two brake beams are activated by at least one brake cylinder that is in fluid communication with a source of compressed air, such as an air reservoir mounted on the body of the railway vehicle.

In general, each brake beam includes a compression beam having terminal ends coupled to the ends of a V-shaped tension beam. A brake head is provided at the opposing terminal ends of the compression beam and/or the V-shaped tension beam. Each brake head includes a brake shoe carrier adapted to receive a removable brake shoe. The brake mechanism is coupled to the truck of the railway vehicle at end portions of the brake heads.

The force-transmitting levers are pivotally connected to each brake beam at a midpoint and utilize lever arms for connection to the force-transmitting members. One of the force-transmitting members is a slack adjuster device, the other force-transmitting member includes a pneumatically actuated brake cylinder device, the body of which is mounted on a first brake beam between the beam tension and compression members adjacent the strut bar, and a connecting rod disposed intermediate the transfer lever arm of a second brake beam and the cylinder body.

The brake cylinder piston push rod is connected to the transfer lever arm of the first brake beam. The cylinder initiates movement of this series of force transmitting members, levers, and linkages to apply the brake of the railway vehicle mounted to the truck assembly of the railway vehicle.

As the brake shoes wear down, the slack adjuster increases in length in order to maintain the correct slack through the use of an actuator control rod or control lever so that the shoes are able to apply sufficient force to the wheels. An overall length/envelope size of a slack adjuster can be varied in accordance with the application and/or type of braking system in which it is being used. One currently used slack adjuster, which is used in truck mounted brake systems, is only capable of taking up slack generated by wear of the wheels and brake shoes wherein the brake shoes have a thickness of approximately 2 inches (52 mm) before the shoes reach their respective condemning limits. Anything past this condition renders the slack adjuster ineffective. As the 2 inch (52 mm) brake shoes wear down, it becomes necessary to replace the brake shoes. The use of thicker brake shoes, such as 3 inch (76 mm) brake shoes, would be desirable as it would increase the amount of time or number of braking applications that can occur before it becomes necessary to replace the brake shoes.

The capability or wear the slack adjuster can compensate for is directly related to the ratio of levers and let-out capabilities of the slack adjuster. Current systems cannot utilize these thicker brake shoes without increasing the initial overall length/envelope size of the slack adjuster. This increase in length would require manually adjusting the lever ratios and/or redesigning the interacting parts of the truck mounted brake system. Thus, there is a need in the art for a slack adjuster which has the same initial overall length/envelope size than the slack adjusters currently in use, but allows a braking system to use thicker brake shoes, such as shoes greater than 2 inches thick, for example, 3 inch (76 mm) brake shoes or even thicker. The use of a slack adjuster having the same initial spatial envelope than previous or currently used designs, but wherein thicker brake shoes could be used, would eliminate the need to adjust and/or change the interacting components of the brake system.

SUMMARY OF THE INVENTION

In one example, a slack adjuster for a braking system is provided and includes at least one of (a) a dual spring and canister assembly or (b) an external yoke trigger. The at least one of (a) the dual spring and canister assembly or (b) the external yoke trigger increases a let-out length of the slack adjuster.

In another example, a braking system includes brake beams each including a compression beam, a tension beam, and a strut secured between the compression beam and tension beam. The braking system also includes brake heads attached to opposing terminal ends of each of the brake beams. Each of the brake heads carries a brake shoe positioned for engagement with a vehicle wheel during a brake application. The braking system also includes a force transfer members pivotally connected to the struts of the brake beams, as well as a rod and a brake cylinder interconnecting one end of the force transfer members. The braking system includes a slack adjuster interconnecting a second end of the force transfer members. The slack adjuster includes at least one of a dual spring and canister assembly or an external yoke trigger. The at least one of (a) the dual spring and canister assembly or (b) the external yoke trigger increases a let-out length of the slack adjuster.

In another example, a method includes retrofitting a brake system with at least one of (a) a dual spring and canister assembly or (b) an external yoke trigger. The at least one of (a) the dual spring and canister assembly or (b) the external yoke trigger increases a let-out length of a slack adjuster of the brake system while maintaining a predetermined spatial envelope of the brake system.]

DETAILED DESCRIPTION

The subject matter described herein relates to a slack adjuster having increased let-out capabilities than previous designs. The slack adjuster can maintain the same initial spatial envelope within a brake or braking system. The brake system can utilize thicker brake shoes without requiring modification of the interacting components of the brake system as the initial overall size of the slack adjuster remains the same. As a result, the range of thicknesses of the brake shoes that can be used in the brake system is larger with the slack adjuster formed in accordance with one or more embodiments of the inventive subject matter described herein (relative to a brake system that includes another slack adjuster or no slack adjuster).

Figure 1:
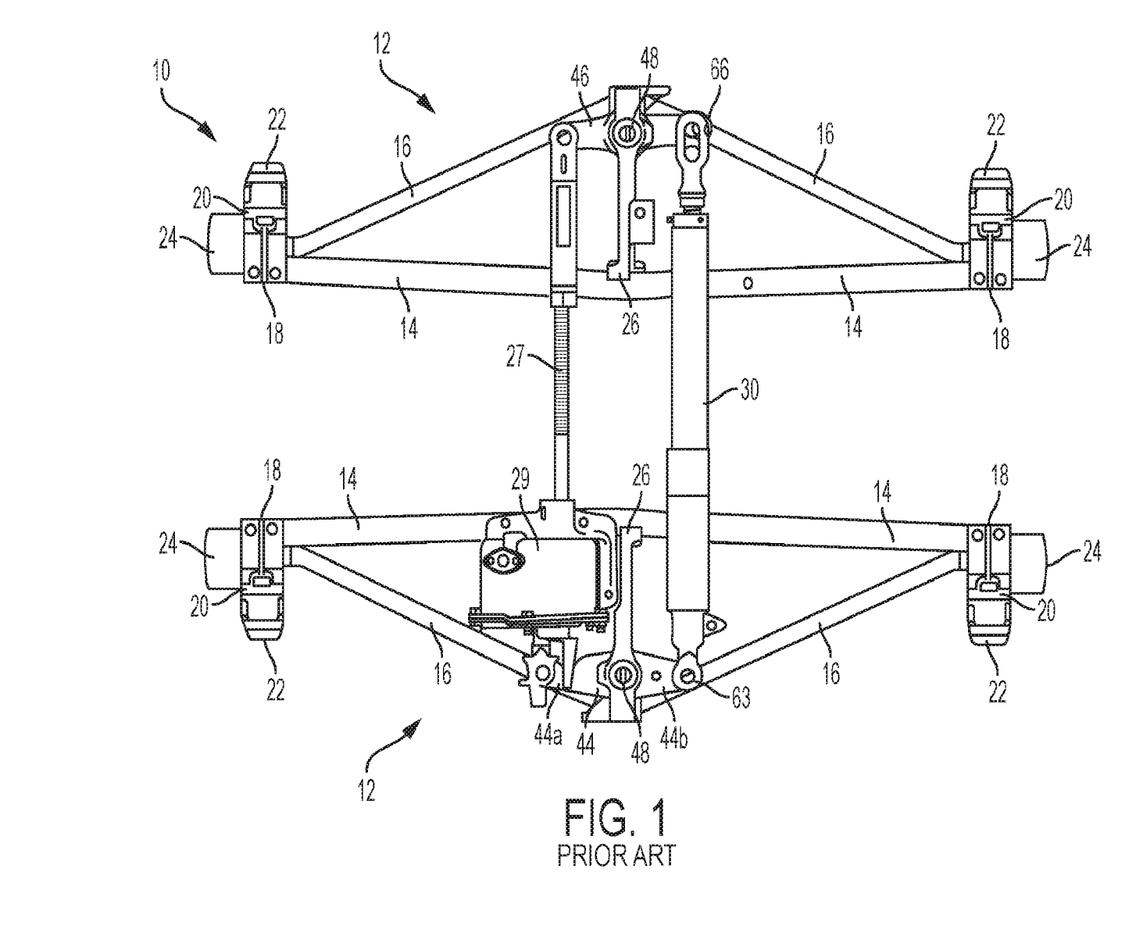
FIG. 1 is a top view of a truck-mounted brake assembly.

FIG. 1 illustrates a truck-mounted brake assembly 10. The brake mechanism 10, as described herein, is intended for connection to a truck of a railway vehicle (not shown), but optionally may be used in connection with another type of vehicle, such as a truck, trailer, or the like. The illustrated brake mechanism 10 is adapted for use in railway vehicles for passenger and/or cargo transit. The brake mechanism 10 optionally has applications in other railway vehicles.

The brake assembly 10 includes a pair of brake beams 12, which are substantially identical. Each of the brake beams 12 includes a compression beam 14, a generally V-shaped tension beam 16, and a strut 26. The terminal ends of the compression beam 14 are coupled to the corresponding terminal ends of the tension beam 16. At a location substantially midway between their opposite ends, the compression beam 14 and the tension beam 16 of the respective brake beams 12 are spaced apart sufficiently to allow connection of the strut 26 therebetween.

A brake head 18 is provided at the opposing terminal ends of the compression beam 14 and/or the tension beam 16. Each brake head 18 includes a brake shoe carrier 20 adapted to receive a removable brake shoe 22. The brake mechanism 10 is coupled to the truck of the railway vehicle (not shown) at end portions or brake head extensions 24 extending from a side portion of the brake heads 18. The brake head extensions 24 cooperate with unit guides located within the truck side frames. In operation, the compression beam 14 and the tension beam 16 hang from the side frames of the truck.

With continuing reference to FIG. 1, the brake assembly 10 further includes a pair of force transmitting levers 44, 46 pivotally connected by pins 48 to the strut member 26 of the respective brake beam 12. The force transmitting members 44, 46 are interconnected by a rod 27 and an automatic compression slack adjuster 30. As shown in FIG. 1, the rod 27 also connects a brake cylinder 29 to one end 44a of the force transmitting lever 44 for transferring the braking force exerted by the brake cylinder to the brake beam 12. The automatic compression slack adjuster 30 includes a front jaw that is attached to the opposing end 44b of the force transmitting lever 44 and a rear jaw 66 attached to the force transmitting member 46 wherein the slack adjuster 30 automatically extends and moves the brake heads 18 closer to the wheels of the railway vehicle in order to compensate for wear of the brake shoes 22.

Figure 2A:
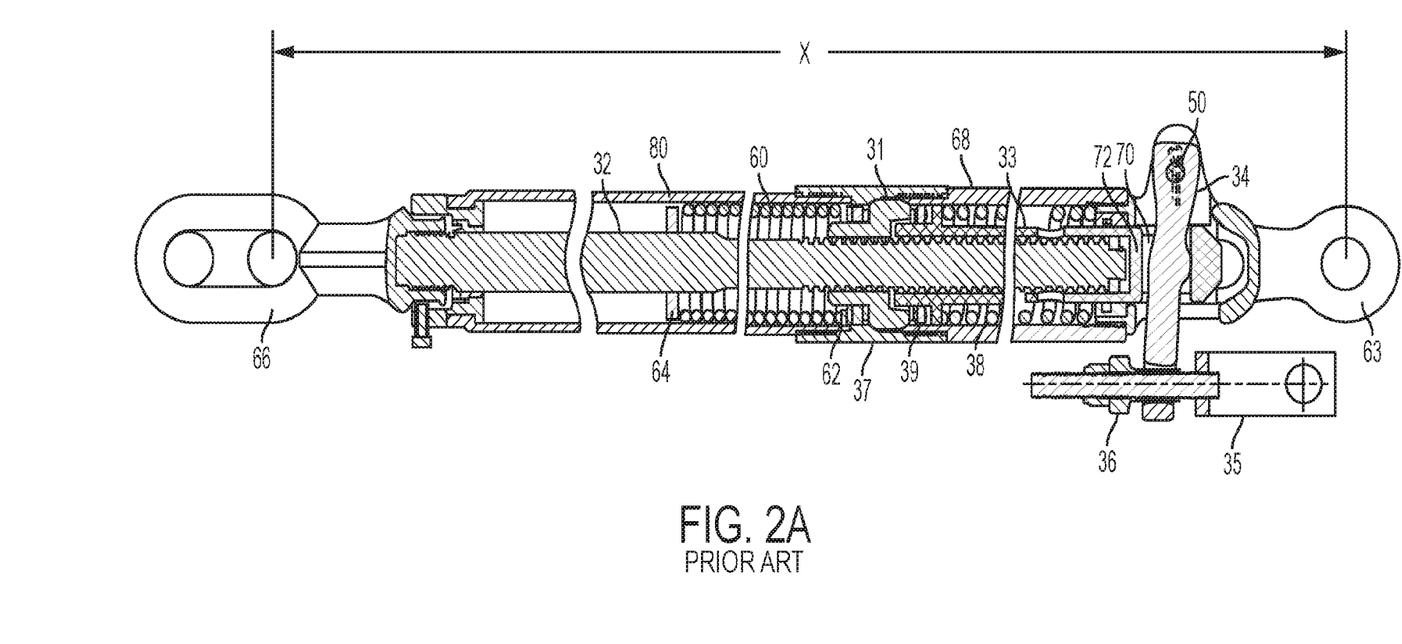
FIG. 2A is a cross-sectional view of a slack adjuster in a compressed condition.
Figure 2B:
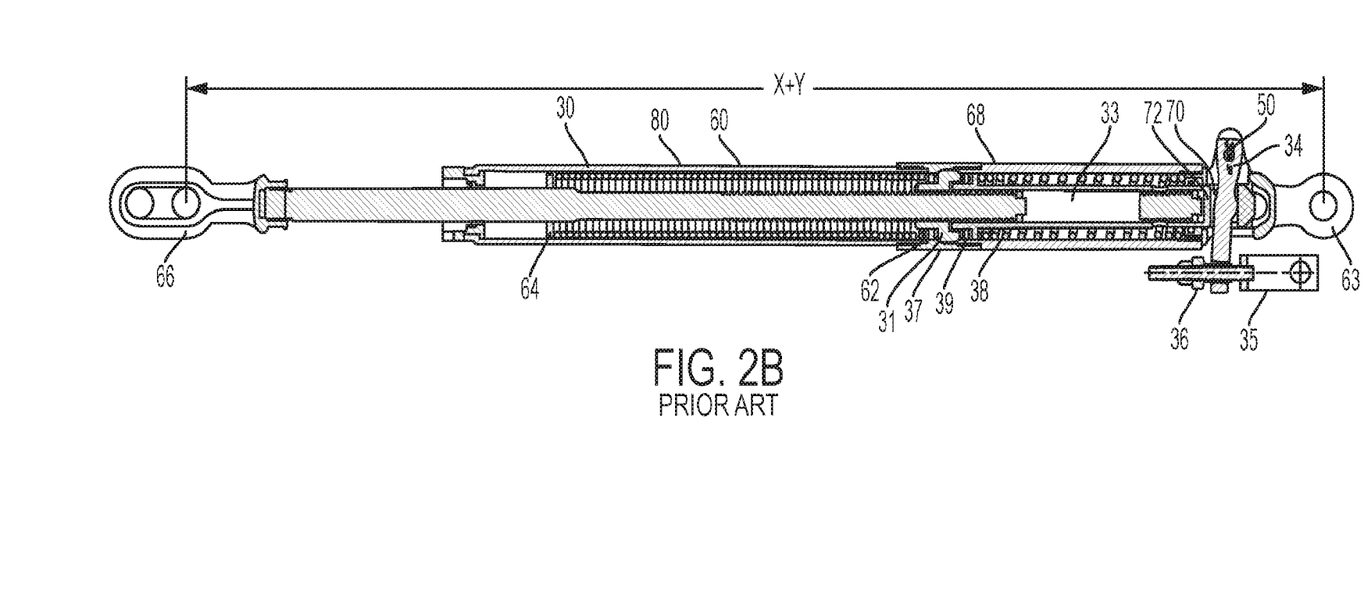
FIG. 2B is a cross-sectional view of a slack adjuster in a fully expanded condition.

Reference is now made to FIGS. 2A and 2B, which show cross-sectional views of the compression slack adjuster 30 of FIG. 1, in compressed and fully extended conditions, respectively. The slack adjuster 30 can have a compressed length or overall envelope size "X" that can vary depending upon the application and/or type of braking system being used. The envelope size of the slack adjuster in the compressed condition can be defined by the following equation: $SA1_C=X$, where $SA1_C$ is the slack adjuster or a first slack adjuster in the compressed condition and X is the compressed length of the slack adjuster. The compression slack adjuster 30 includes a cone lock nut 31, which rotates over a non-rotating threaded rod assembly or main rod 32. The slack adjuster 30 automatically extends in length to take up slack that occurs due to wear of the brake shoes 22 during use of the braking mechanism 10 so that the shoes are able to apply sufficient force to the wheels. The slack adjuster 30 is capable of taking up slack generated by a reduction in thickness of the brake shoes 22 due to friction between the brake shoes 22 and the wheels causing a reduction in the thickness of the brake shoes 22 and/or wear of the wheels, and/or due to wear of the brake rigging itself that occurs after repeated brake applications. In one example, the brake shoes can have a thickness up to 2 inches (52 mm) and the slack adjuster is capable of taking up the slack caused by wear of these 2 inch (52 mm) shoes and wear caused to the wheels before the slack adjuster 30 becomes ineffective.

The slack adjuster 30 is shown in FIG. 2B in a fully extended condition "X+Y", where "Y" denotes the full extension amount of the slack adjuster. Accordingly, the length of the slack adjuster in the fully extended condition can be defined by the following equation: $SA1_E=X+Y$, where $SA1_E$ is the slack adjuster or the first slack adjuster in the fully extended position; X is the compressed length of the slack adjuster; and Y is the extension amount of the slack adjuster. The amount of let-out or taking up of slack is measured on each brake application by the control mechanism that comprises the overtravel control rod 33, the trigger 34, the control rod 35, and the control rod nut 36. When the brakes are released, the control rod 35 is positioned away from the trigger 34. The cone lock nut 31, which governs the length of the slack adjuster 30, is frictionally locked against the cone nut housing 37 by the force of the overtravel spring 38.

With continuing reference to FIGS. 2A and 2B, while referring back to FIG. 1, as the brakes are applied, the cylinder push rod 27 and control rod 35, which are connected to the opposing end 44b of the force transmitting lever 44, extend. Prior to the brake shoes 22 contacting the wheels, the control rod 35 causes the control rod nut 36 to contact the trigger 34. As piston travel increases, the trigger 34 fulcrums about the trigger pin 50. This compresses the overtravel spring 38 and moves the overtravel control rod 33 away from the bearing assembly 39 and cone lock nut 31. The compression of the overtravel spring 38 releases the load that frictionally locks the cone lock nut 31 to the cone nut housing 37. The cone lock nut 31 is now unlocked and free to rotate over the threads of the main rod assembly 32. The load from the main spring 60, located within the main spring housing 80, is compressed between the overtravel spring seat 62 and the washer 64 of the rod assembly 32 extends the rod assembly 32. The main rod assembly 32 will extend until the brake shoes contact the wheels. Piston travel continues to increase until the load on the main rod assembly 32, through the transfer lever 46 and rear jaw 66, becomes greater than the force of the main spring 60 and moves the cone lock nut 31 laterally, which frictionally locks it with the overtravel housing 68 and prevents any further taking-up of slack. At this point, the brakes are fully applied and the present piston travel will be obtained.

As the brakes release, the piston rod retracts and removes the force on the control rod 35. With the release of this force, the trigger 34 is once again free to fulcrum about the trigger pin 50. At this point, the overtravel spring 38 is the dominant force and moves the cone lock nut 31 laterally off of the overtravel housing 68 and returns to a release position frictionally locked against the cone nut housing 37.

Figure 3:
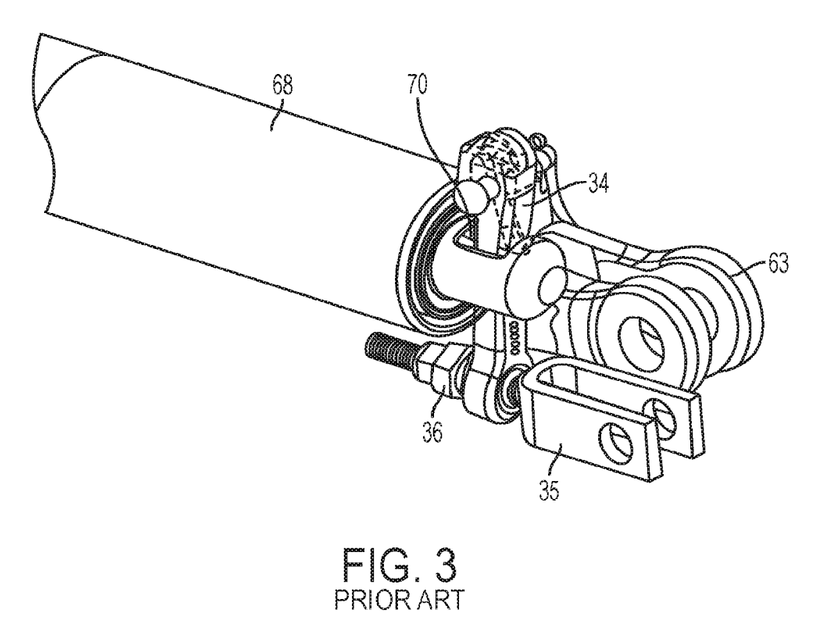
FIG. 3 is a partial perspective view of an internal trigger of a slack adjuster.
Figure 4:
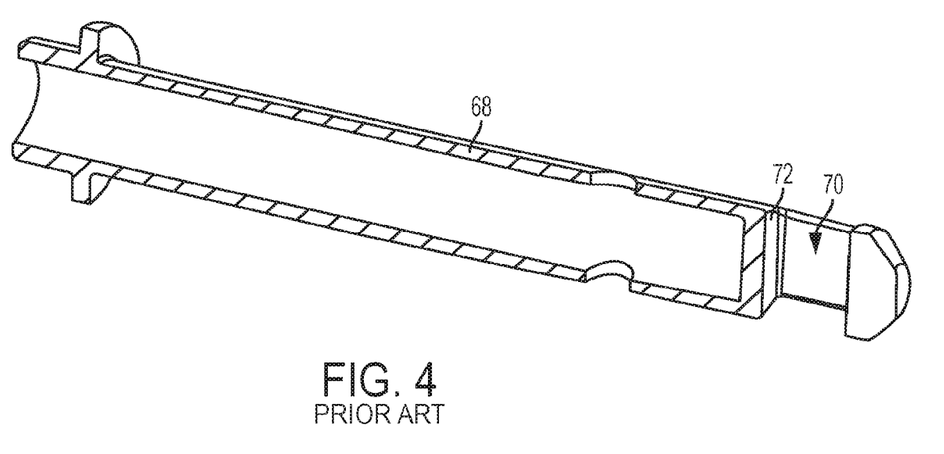
FIG. 4 is a partial cross-sectional perspective view of the overtravel housing portion of the slack adjuster of FIG. 3 for use with an internal trigger.

Reference is now made to FIG. 3, which shows a partial perspective view of the trigger 34 of FIG. 2A. Reference is also made to FIG. 4, which is a partial cross-sectional perspective view of the overtravel housing portion of the slack adjuster of FIG. 3. The trigger 34 of FIGS. 2A and 3 is an internal trigger of a slack adjuster 30 in accordance with the prior art. The trigger 34 extends through an opening 70 in the overtravel control rod 33. This design limits how far the main rod assembly 32 can retract into the slack adjuster 30 because the main rod assembly 32 has to stop short of the area in the overtravel control housing 68 at the location where the trigger 50 passes through on a solid stop 72 in the overtravel control housing 68.

Figure 5:
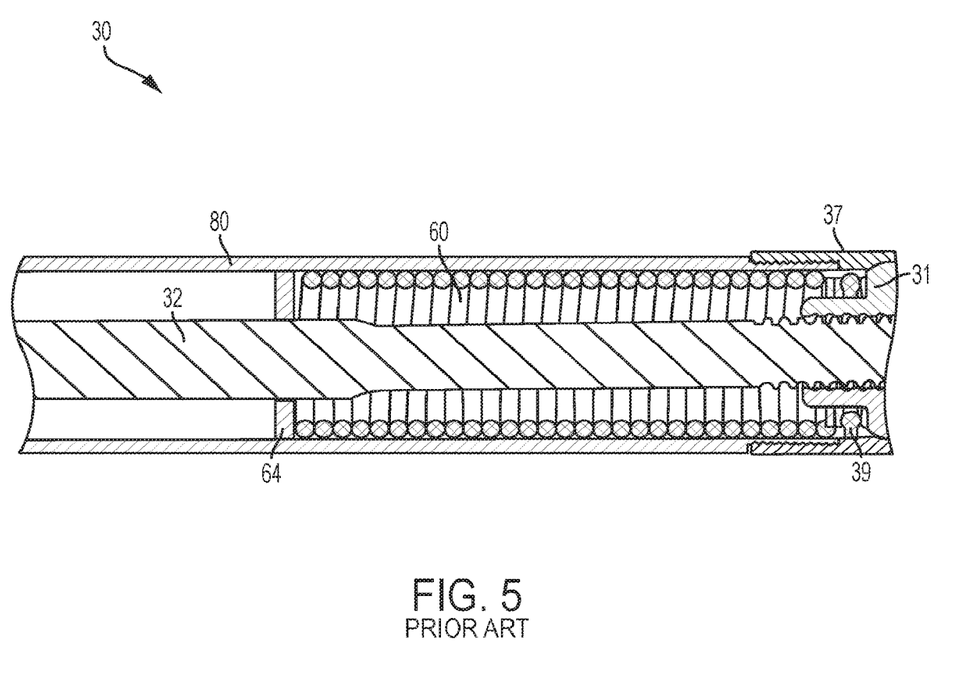
FIG. 5 is a partial cross-sectional view of the main spring housing portion of the slack adjuster of FIG. 2A.

FIG. 5 shows a partial cross-sectional view of the main spring housing portion 80 of the slack adjuster 30 of FIG. 2A. The main spring housing portion 80 includes a single main spring 60. This design is limited in its travel expansion whilst maintaining the required spring force to allow proper operation of the slack adjuster 30.

Figure 6:
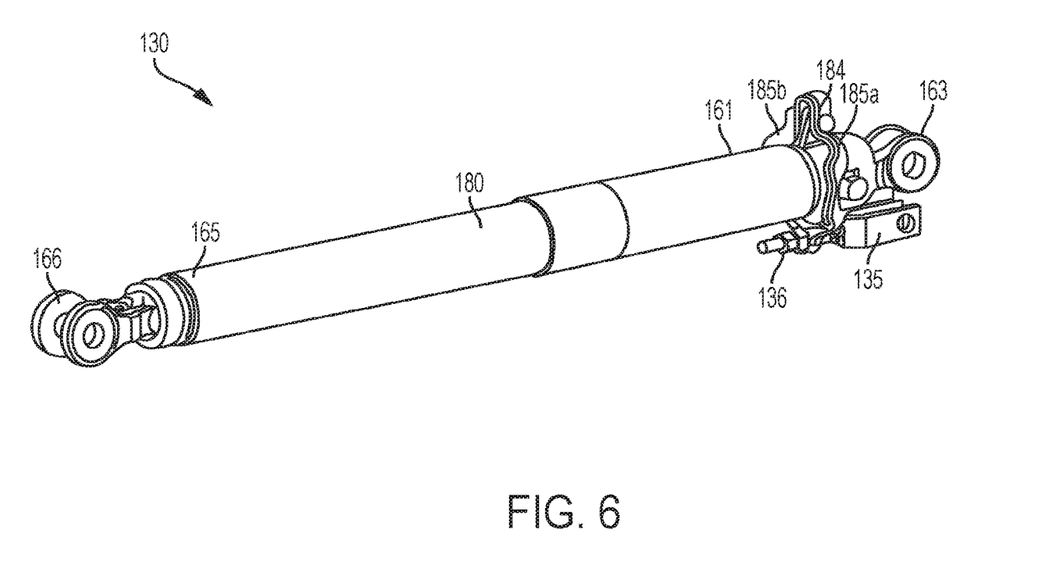
FIG. 6 is a perspective view of a slack adjuster in accordance with one embodiment of the inventive subject matter.
Figure 7:
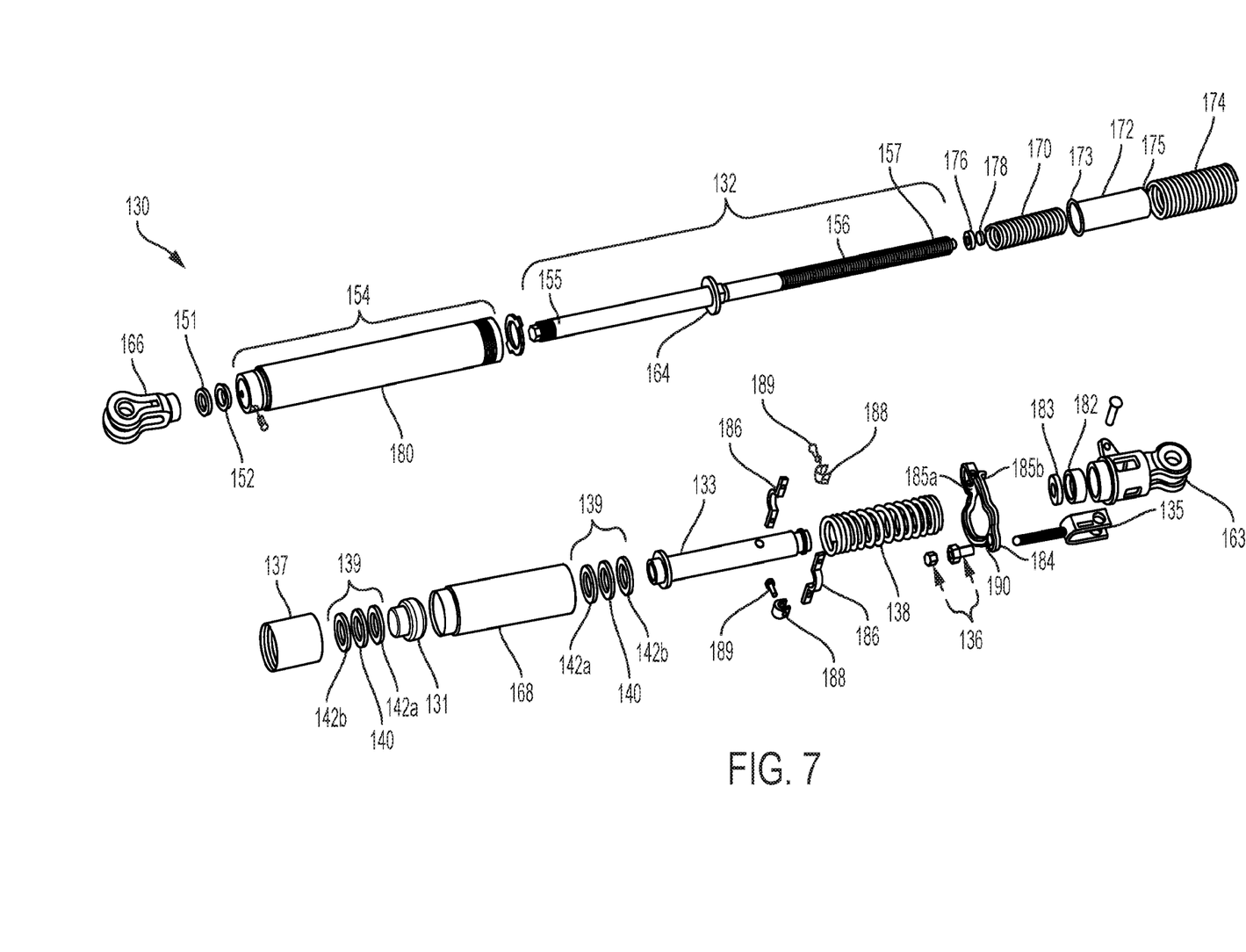
FIG. 7 is an expanded perspective view of the slack adjuster of FIG. 6 in accordance one embodiment of the inventive subject matter.
Figure 10:
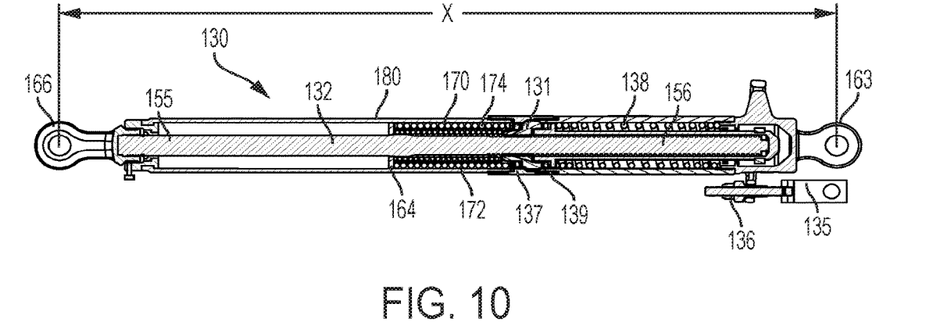
FIG. 10 is a cross-sectional view of the slack adjuster of FIG. 6 in a compressed condition and including a dual spring in accordance one embodiment of the inventive subject matter.

Reference is now made to FIGS. 6, 7, and 10, which show a slack adjuster, generally indicated as 130, in accordance with the inventive subject matter. As stated above, one example of a current slack adjuster for truck mounted brake systems is typically effective for use with 2 inch (52 mm) brake shoes. The slack adjuster 130 enables use of thicker brake shoes, such as, for example, 3 inch (76 mm) brake shoes, within the same initial spatial envelope "X", in FIG. 10, as the brake assembly shown in FIG. 2A, using 2 inch (52 mm) brake shoes.

The slack adjuster 130 can have a compressed length or overall envelope size "X" that can vary depending upon the application and/or type of braking system being used. The envelope size of the present slack adjuster in the compressed condition can be defined by the following equation: $SA2_C=X$, where $SA2_C$ is the slack adjuster in the compressed condition of a second slack adjuster; and X is the compressed length of the slack adjuster. As stated above, the compressed envelope size "X" will be the same for both the slack adjuster of $SA1_C$ and the slack adjuster of $SA2_C$ i.e., where $SA1_C=X=SA2_C$.

The combination of an external yoke trigger, as discussed in further detail below in regards to FIGS. 8 and 9, with a dual spring and canister assembly, as discussed in further detail below in regards to FIGS. 10-12, results in the slack adjuster 130 having an overall extended length or let-out length as denoted by "X+Z" in FIG. 13, where Z>Y and wherein this length Z is sufficient to be used with thicker brake shoes, such as 3 inch (76 mm) brake shoes or other brake shoe thickness, while maintaining the same spatial envelope "X" as shown in FIG. 2A. Accordingly, the length of the slack adjuster in the fully extended condition can be defined by the following equation $SA2_E=X+Z$, where $SA2_E$ is the length of the slack adjuster or the second slack adjuster in the fully extended position; X is the compressed length of the slack adjuster; and Z is the extension amount of the slack adjuster. This presently designed slack adjuster 130 can be used without the need for any manual adjustment or design changes to the interacting parts of the truck mounted braking system because the overall size "X" of the slack adjuster 130 remains the same.

Accordingly, the fully extended length of the slack adjuster in accordance with the invention can be defined by the following series of equations:

$$SA1_C=X;$$

$$SA1_E=X+Y;$$

$$SA2_C=X;$$

$$SA2_E=X+Z;$$

$$SA1_C=X=SA2_C; \text{ and } Z>Y$$

where, $SA1_C$ is the compressed length of the first slack adjuster;

$SA1_E$ is the fully extended length of the first slack adjuster;

X is the compressed length of both the first and second slack adjusters;

Y is the extension amount of the first slack adjuster;

$SA2_C$ is the compressed length of the slack adjuster or second slack adjuster in accordance with at least one embodiment of the inventive subject matter;

$SA2_E$ is the fully extended length of the slack adjuster or second slack adjuster; and Z is the extension amount of the second slack adjuster.

With continuing reference to FIGS. 6 and 7, the slack adjuster 130 includes an elongated hollow cylindrical housing member 180 which is restrained against rotation and pivotally connectable at a first end 161 thereof, to the brake rigging with a front jaw 163 and pivotally connectable at a second end 165 thereof, to the brake rigging with a rear jaw 166. The second end 165 of the housing member 180 includes a main housing seal 151 and a polymer insert 152. The first end 161 of the housing member 180 also includes a control rod 135. The elongated cylindrical housing member 180 includes a main housing 154, a cone nut housing 137, and an overtravel housing 168. An elongated rod member or main rod 132 is positioned for reciprocal movement within the housing member 180 through the second end 165 of the housing member 180. The elongated rod member or main rod 132 is restrained against rotation and pivotally connectable at a first end 155 thereof, to the brake rigging by the rear jaw 166. The rod member has a threaded portion 156 adjacent a second end 157 that extends into the housing member 180 and through the second end 165 of the housing member 168.

With continuing reference to FIGS. 6 and 7, the slack adjuster 130 includes an operating area that includes the components of the slack adjuster 130 which operate together to adjust the brake rigging. One example of an operating area includes a positioning member, such as a cone lock nut 131, that is located within the cone nut housing 137, and threadedly engaged with the threaded portion 156 of the elongated rod or main rod 132. The cone lock nut 131 is positioned between a pair of overtravel bearing assemblies 139. Each of the overtravel bearing assemblies comprise a ball bearing 140 sandwiched between an inner race 142a and an outer race 142b. The cone lock nut 131 rotates about the threaded portion 156 of the elongated rod or main rod 132 between respective first abutting engagement, disengagement, and second abutting engagement positions to change the length of the slack adjuster 130 by changing the relative longitudinal positions between the housing member 180 and the elongated rod or main rod 132.

Figure 11:
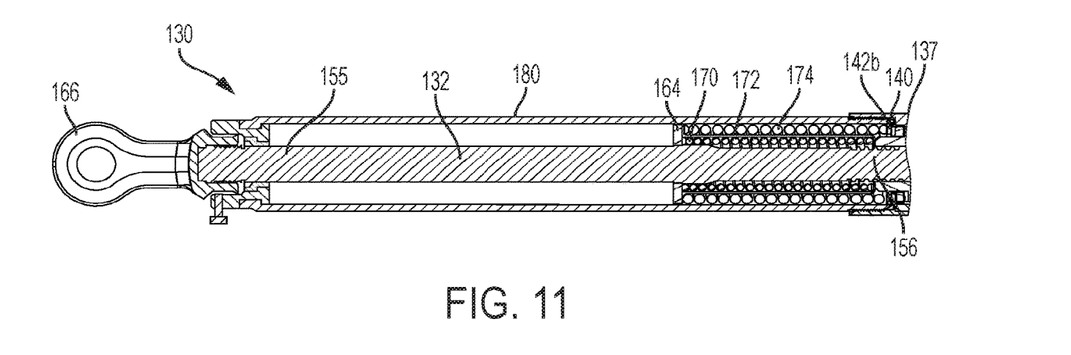
FIG. 11 is a partial cross-sectional view of the dual spring of FIG. 10 at a closed or compressed condition in accordance one embodiment of the inventive subject matter.
Figure 12:
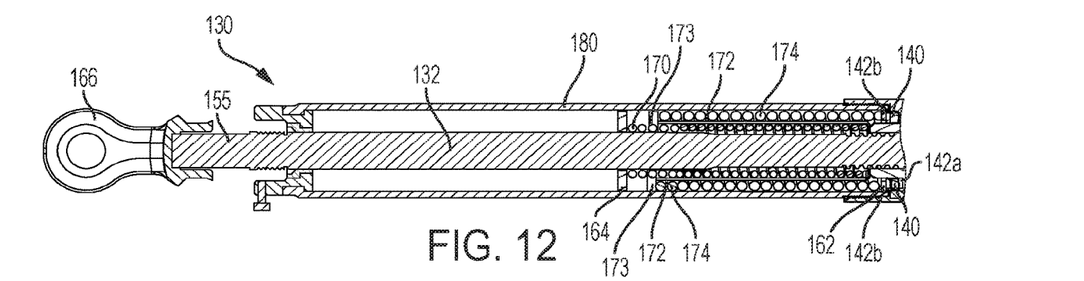
FIG. 12 is a partial cross-sectional view of the dual spring of FIG. 10 in a partially expanded condition in accordance one embodiment of the inventive subject matter.

As shown in FIG. 7 and discussed in further detail below with respect to FIGS. 10-12, the slack adjuster 130 also includes a first urging assembly which can include an inner spring 170, located within a spring cup or canister 172, and an outer spring 174 which abuts the overtravel spring seat 162, as shown in FIGS. 10-12, for urging the cone lock nut 131 into a first position, such as a disengaged position, with respect to the housing member 168. The inner spring 170 abuts a washer 164 and cooperates with a collet 176 and retaining ring 178.

With continuing reference to FIG. 7, a second urging assembly is also provided which, according to one embodiment, can include an overtravel spring 138 located within an overtravel housing 168. The overtravel spring 138 is stronger than the first urging assembly so as to overcome the force applied by the urging assembly and, therefore, urge the cone lock nut 131 into a second position. Other types of urging members, such as fluid operated cylinders may be used in place of the overtravel spring 138.

Figure 8:
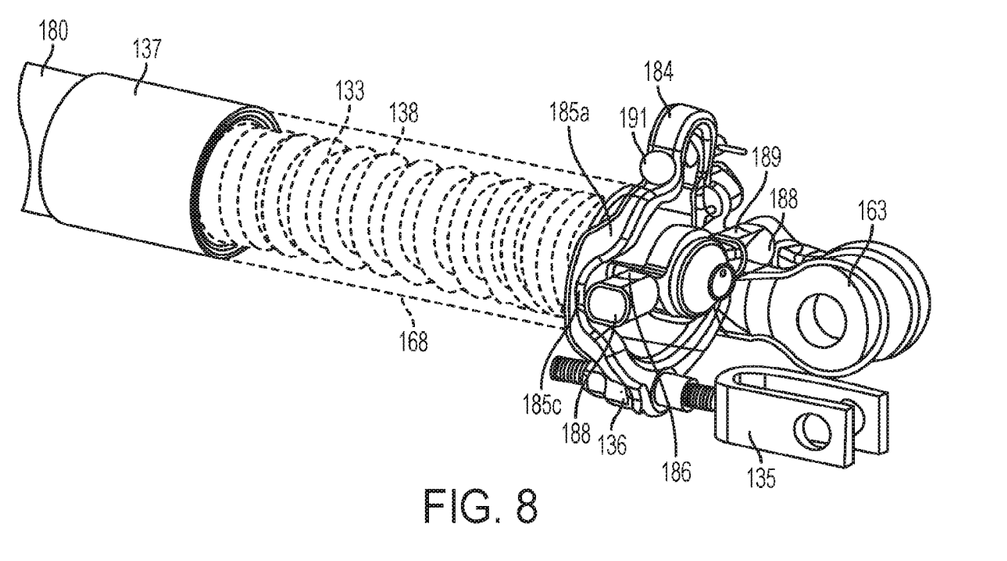
FIG. 8 is a partial cut-away perspective view of the external yoke trigger of the slack adjuster of FIG. 6 in accordance one embodiment of the inventive subject matter.
Figure 9:
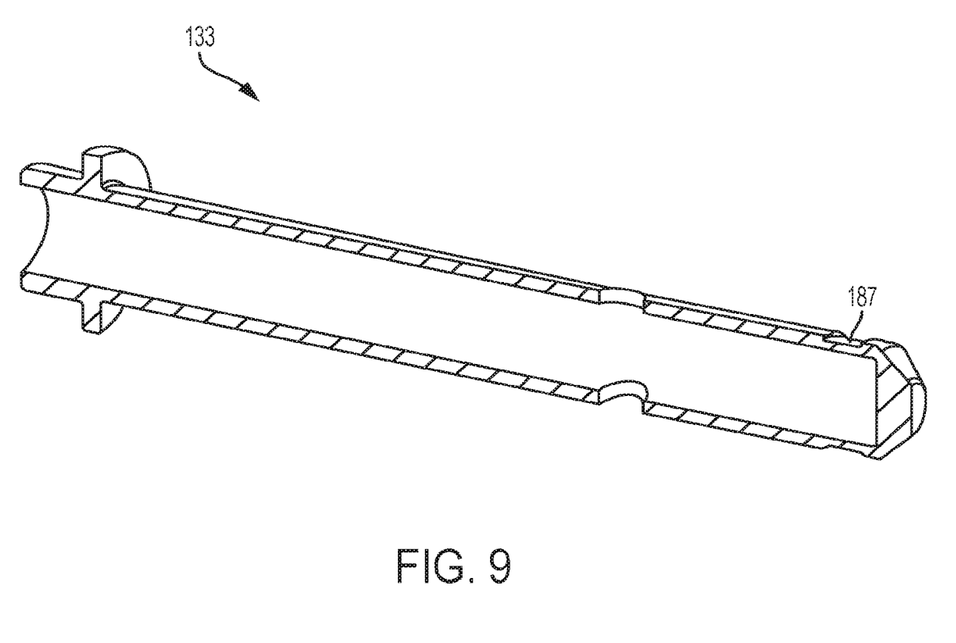
FIG. 9 is a partial cross-sectional perspective view of the overtravel housing portion of the slack adjuster of FIG. 6 for use with the external yoke trigger in accordance one embodiment of the inventive subject matter.

With continuing reference to FIGS. 6 and 7 and with further reference to FIG. 8, other components located at the front end of the slack adjuster 130 include a molded insert 182 and a wiper seal 183. Also located at the front end of the slack adjuster 130 is the external yoke trigger 184. The external yoke trigger 184 includes a pair of clamps 185a, 185b configured to grasp the overtravel control rod 133. The pair of clamps 185a, 185b is positioned about the overtravel control rod 133 and clamped in place via a connecting member 191, such as a pin, rivet, screw, and the like. The clamps 185a, 185b may encircle or partially encircle an outer surface of the control rod 133. This design allows for the use of a hollow overtravel control rod 133, as shown in FIG. 9. A trigger ring 186 is positioned about a recessed portion 187 of the overtravel control rod 133. According to one embodiment, the trigger ring 186 can be a two-piece trigger ring that is joined together and about the overtravel control rod 133 via a pair of trigger studs 188 and rivets 189. The trigger studs 188 cooperate with the clamps 185a, 185b of the external yoke trigger 184 to hold the overtravel control rod 133 within the overtravel housing 168. The clamps 185a, 185b can encircle or at least partially encircle the overtravel housing 168. The clamps 185a, 185b can include a recessed portion 185c configured to cooperate with the trigger studs 188. The trigger 184 is connected to the control rod 135 via an aperture 190 extending therethrough and a nut/hex locknut 136 arrangement. The hollow overtravel control rod 133 allows for the main rod 132 to retract further into the slack adjuster 130 and utilize more space within the same embodiment envelope. The external yoke trigger 184 also allows for a method to actuate the overtravel via the clamps 185a, 185b, which an internal type trigger would not be capable of doing. The external yoke trigger 184 allows the truck mounted brake system to work as originally designed while removing spatial constraints within the original embodiment of the slack adjuster.

Reference is now made to FIGS. 10-13, which illustrate the slack adjuster 130 including a dual spring and canister assembly. The use of dual springs in series separated by a spring cup or canister in a nesting arrangement makes it possible to preserve the required spring forces for operation, while allowing for greater expansion of the slack adjuster within the original envelope of the truck mounted braking system. Referring back to FIGS. 2A and 2B, a specific spring force balance is required between the main spring 60 and the overtravel spring 38 in order for the slack adjuster to function properly. However, the use of a single main spring 60 is limited in its travel/expansion whilst maintaining the required spring force to allow proper operation of the slack adjuster 30. The slack adjuster 130 utilizes an inner spring 170 and an outer spring 174 separated by a spring cup or canister 172. The spring cup or canister 172 includes an outer lip 173 that acts like a stop member for the outer spring 174 and a bottom cup portion 175 that functions as a stop member for the inner spring 170, which allows the springs 170, 174 to nest within one another. The outer lip 173 can be referred to as a radially outwardly protruding lip or flange and can be disposed at an opposite end of the cup or canister 172 (than the bottom cup portion 175). As shown in FIGS. 10 and 11, this nesting arrangement allows for compression of the springs 170, 174 to the same closed position as the single main spring 60, as illustrated in FIG. 2A.

Figure 13:
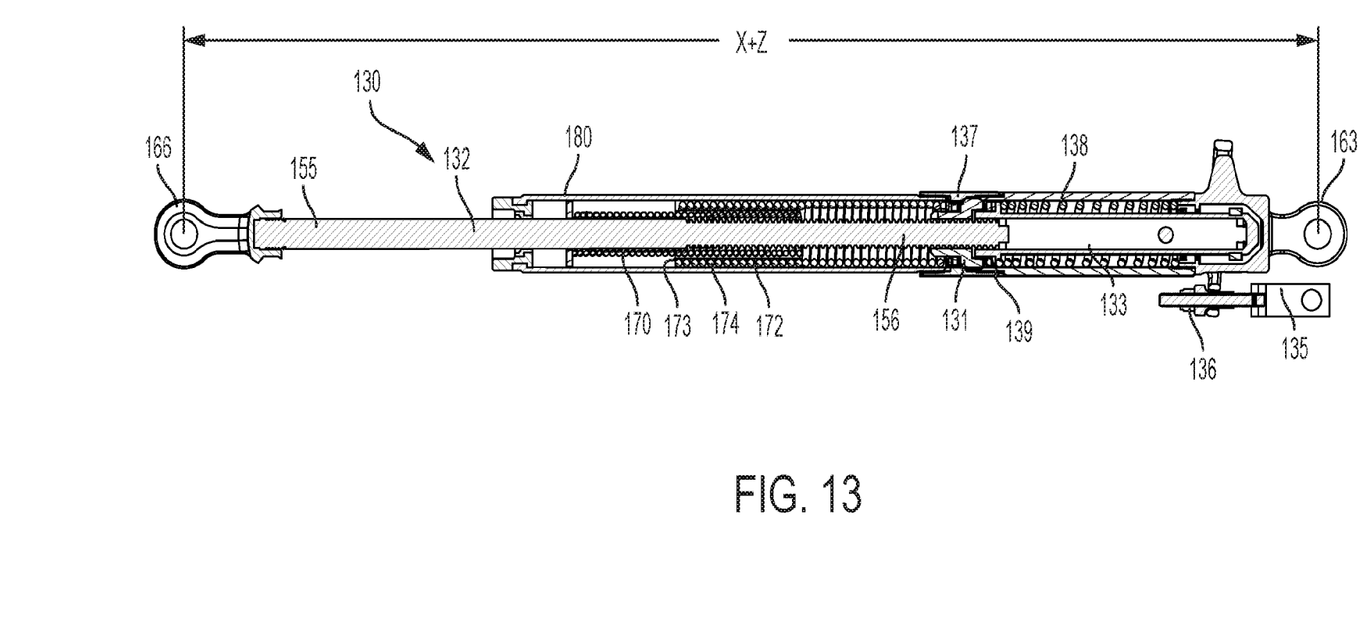
FIG. 13 is a cross-sectional view of the slack adjuster of FIG. 10 in a fully expanded condition in accordance one embodiment of the inventive subject matter.

Referring now to FIGS. 12 and 13, the combination of the inner and outer springs 170, 174, along with the spring cup or canister 172, allows for a greater travel/expansion than the single main spring 60 while being able to maintain the spring force required for the slack adjuster 130 to function properly over a longer range of movement of the main rod 132. Additionally, the use of the nested spring arrangement, along with the external yoke trigger as described above, enables the slack adjuster 130 to fully extend to a length of "X+Z" as opposed to a length of "X+Y" of the prior art, wherein Z>Y, resulting in a greater overall extended length of the slack adjuster 130 which increases the let out capabilities of the slack adjuster 130 enabling the use of thicker brake shoes in the braking arrangement.

The slack adjuster can have both the external trigger and the dual spring and canister assembly, which allows one to maintain the same initial spatial envelope of the prior slack adjusters and, thus, does not require any change to the interacting components of the truck mounted brake system because the size of the slack adjuster remains unchanged. The slack adjuster can include either one of the external trigger or the dual spring and canister assembly of the present disclosure, which would result in the capability of more let-out of the slack adjuster, but require a change to the overall size of the slack adjuster and consequently modification of the braking system. One or both of the external trigger and dual spring and canister assembly can be used in order to achieve the desired let-out capabilities of the slack adjuster in order to accommodate a range of sizes of brake shoes within a variety of sized braking systems while maintaining a constant envelope size "X".

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A slack adjuster for a braking system, the slack adjuster comprising:
   an elongated housing member having opposite ends configured to be interconnected with brake heads, the housing member configured to change length in response to activation of the braking system and in response to wear of a brake shoe coupled with at least one of the brake heads;
   a hollow control rod and a main rod disposed within the housing member, the hollow control rod configured to be held to the housing member by an external yoke trigger and shaped to allow the main rod to move within and relative to the hollow control rod to change the length of the housing member in response to the activation of the braking system and in response to wear of the brake shoe coupled with at least one of the brake heads, wherein the external yoke trigger comprises a pair of clamps configured to grasp the hollow control rod, wherein the pair of clamps are located outside of the housing member, and wherein the pair of clamps is clamped in place by a connecting member; and
   a dual spring and canister assembly comprising nested springs, and wherein a length of the slack adjuster is configured to be changed by at least one of the nested springs being compressed within the dual spring and canister assembly.

2. The slack adjuster of claim 1, wherein the pair of clamps is configured to cooperate and encircle an outer surface of the hollow control rod.

3. The slack adjuster of claim 1, including a trigger ring encircling a portion of the hollow control rod and configured to cooperate with the external yoke trigger to secure the hollow control rod within the housing member.

4. The slack adjuster of claim 1, wherein the hollow control rod and the main rod are configured to change the length of the housing member to receive the brake shoe having a thickness greater than two inches.

5. The slack adjuster of claim 1, wherein the hollow control rod and the main rod are configured to couple ends of force transfer members pivotally connected to brake beam struts of the braking system.

6. A braking system comprising:
   brake beams each including a compression beam, a tension beam, and a strut secured between the compression beam and tension beam;
   brake heads attached to opposite terminal ends of each of the brake beams, each of the brake heads carrying a brake shoe positioned for engagement with a vehicle wheel during a brake application;
   force transfer members pivotally connected to the struts of the brake beams;
   a rod and a brake cylinder interconnecting one end of the force transfer members;
   a slack adjuster interconnecting second ends of the force transfer members, the slack adjuster including an elongated housing member having opposite third ends coupled with the force transfer members, the slack adjuster also including a hollow control rod and a main rod disposed within the housing member, the slack adjuster configured to change a length of the housing member in response to activation of the braking system and in response to wear of a brake shoe coupled with at least one of the brake heads, the hollow control rod held to the housing member by an external yoke trigger comprising a pair of clamps configured to grasp the hollow control rod, wherein the pair of clamps are located outside of the housing member, and wherein the pair of clamps is clamped in place by a connecting member; and
   a dual spring and canister assembly comprising nested springs, and wherein a length of the slack adjuster is changed by at least one of the nested springs being compressed within the dual spring and canister assembly.

7. The braking system of claim 6, wherein the hollow control rod is shaped to allow the main rod to move within and relative to the hollow control rod.

8. The braking system of claim 6, further comprising:
   a trigger ring encircling a portion of the hollow control rod and configured to cooperate with the external yoke trigger to secure the hollow control rod within the slack adjuster.

9. A method comprising:
   coupling a slack adjuster with force transfer members of a braking system that also includes brake beams with brake heads coupled with the force transfer members, the slack adjuster including an elongated housing member having opposite ends coupled with the force transfer members, the slack adjuster also including at least one of (a) a dual spring and canister assembly disposed within the housing member, wherein the dual spring and canister assembly comprises nested springs, and wherein a length of the slack adjuster is changed by at least one of the nested springs within the dual spring and canister assembly being compressed within the dual spring and canister assembly, or (b) a hollow control rod and a main rod disposed within the housing member, the hollow control rod held to the housing member by an external yoke trigger comprising a pair of clamps configured to grasp the hollow control rod;

changing the length of the slack adjuster in response to activation of the braking system and in response to wear of a brake shoe coupled with at least one of the brake heads, wherein the length of the slack adjuster is changed by the main rod moving within the hollow control rod; and clamping the pair of clamps in place by a connecting member.

* * * * *